(12) United States Patent
Wenzler (10) Patent No.: US 10,198,473 B2
(45) Date of Patent: Feb. 5, 2019

(54) HIERARCHICAL DOCUMENT FLOW DETERMINATION

(71) Applicant: SAP SE, Walldorf (DE)

(72) Inventor: Rudolf Wenzler, Besigheim (DE)

(73) Assignee: SAP SE, Walldorf (DE)

( * ) Notice: Subject to any disclaimer, the term of this patent is extended or adjusted under 35 U.S.C. 154(b) by 299 days.

(21) Appl. No.: 14/692,029

(22) Filed: Apr. 21, 2015

(65) Prior Publication Data

US 2016/0314169 A1 Oct. 27, 2016

(51) Int. Cl.
*G06F 17/00* (2006.01)
*G06F 17/30* (2006.01)

(52) U.S. Cl.
CPC .. *G06F 17/30466* (2013.01); *G06F 17/30011* (2013.01); *G06F 17/30589* (2013.01)

(58) Field of Classification Search
CPC ......... G06F 17/30466; G06F 17/30589; G06F 17/30011
See application file for complete search history.

(56) References Cited

U.S. PATENT DOCUMENTS

| | | | |
|---|---|---|---|
| 6,105,033 A | 8/2000 | Levine | |
| 6,339,768 B1 | 1/2002 | Leung et al. | |
| 7,058,648 B1 * | 6/2006 | Lightfoot | G06F 17/30011 |
| 7,533,380 B2 | 5/2009 | Neuer et al. | |
| 7,624,338 B2 | 11/2009 | Opitz et al. | |
| 7,644,062 B2 | 1/2010 | Su et al. | |
| 7,657,541 B2 | 2/2010 | Meuer et al. | |
| 7,899,825 B2 | 3/2011 | Davis et al. | |
| 7,933,981 B1 | 4/2011 | Cannon, III et al. | |
| 8,332,751 B2 | 12/2012 | Stokes et al. | |
| 8,392,460 B2 | 3/2013 | Hoang et al. | |
| 8,666,852 B1 | 3/2014 | Lang et al. | |
| 8,825,673 B2 | 9/2014 | Ravid et al. | |
| 2004/0267595 A1 | 12/2004 | Woodings et al. | |
| 2007/0239691 A1 | 10/2007 | Ordonez et al. | |

OTHER PUBLICATIONS

Alfons Kemper, Donald Kossmann, and Bernhard Zeller, "Performance Tuning for SAP R/3", Bulletin of the IEEE Computer Society Technical Committee on Data Engineering, 1999, pp. 32-39.*

(Continued)

*Primary Examiner* — Cheryl Lewis
(74) *Attorney, Agent, or Firm* — Mintz Levin Cohn Ferris Glovsky and Popeo, P.C.

(57) ABSTRACT

A computer-implemented method is used to determine a document flow of documents, data on the documents being stored in a documents database. The method involves assigning a hierarchical tree-like structure to the documents. The hierarchical tree-like structure includes one or more hierarchy levels beginning with a document assigned to a root node of the tree-like structure. Each hierarchy level is defined by the direct relations between the documents assigned to tree nodes in the hierarchy level. The method further includes assembling, for a pre-determined number of hierarchy levels, a tabular representation of the hierarchical tree-like structure assigned to the documents, and providing the tabular representation as the document flow.

20 Claims, 7 Drawing Sheets

(56) References Cited

OTHER PUBLICATIONS

Extended European Search Report for European Application 16166262.2, dated Sep. 5, 2016, 12 pages.
Microsoft, Inc., "Recursive Queries Using Common Table Expression", Aug. 11, 2003, pp. 1-5, XP055293260, Microsoft.com.
Zhou et al., "Efficient Exploitation of Similar Subexpressions for Query Processing", Proceedings of the ACM Sigmod International Conference on Management of Data, Beijing, China, Jun. 12-14, 2007, Jun. 14, 2007, p. 533-544, XP055293279.
Sheffield et al., "Advanced Select Techniques", In: "SQL Server 2012 T-SQL Recipes: A Problem-Solution Approach", Sep. 18, 2012, Apress, XP055293274, pp. 93-113.
Sheffield et al., "Managing Views", In: "SQL Server 2012 T-SQL Recipes: A Problems-Solution Approach", Sep. 18, 2012, Apress, XP055293277, pp. 301-318.
Summons to Attend Oral Proceedings for European Application 16166262.2, dated Oct. 6, 2017, 10 pages.
Celko, Joe, "Adjacency List Model", Celko; "Adjacency List Model" In: "Joe Celko's Trees and Hierarchies in SQL for Smarties"; May 7, 2004; Morgan Kaufman, San Francisco; XP055394692; pp. 1-225.
Stephens, Rod, "Data Storage Design", Stephens; "Data Storage Design" In: "Expert One-on-One Visual Basic 2005 Design and Development"; Feb. 5, 2007; Wiley Publishing, Inc.; XP055394684; pp. 133-162.
Office Action for European Application No. 16166262.2, dated Apr. 13, 2017, 7 pages.
Anonymous, "Remodeling Recursive Hierarchy Tables for Business Intelligence", Jun. 3, 2013; pp. 1-9, XP055360362, 9 pages.
Anonymous, "Electronic Document", Wikipedia, Nov. 26, 2014, XP055471490, retrieved on Apr. 30, 2018 from https://en.wikipedia.org/w/index.php?title=Electronic_document&oldid=635493095, pp. 1-2.
EP Communication Under Rule 71(3) EPC for European Application No. 16166262.2, dated Jun. 18, 2018, 12 pages.

* cited by examiner

| Pred | Succ | Level |
|------|------|-------|
| O1   | S1   | 00    |
| S1   | I1   | 01    |
| S1   | G1   | 01    |

| Root | Pred | Succ | Level |
|------|------|------|-------|
| O1 | O1 | S1 | 00 |
| O1 | S1 | I1 | 01 |
| O1 | S1 | G1 | 01 |

HIERARCHICAL DOCUMENT FLOW DETERMINATION

BACKGROUND

Computer systems can run computer programs (e.g., "business applications") to perform various business functions. These business applications (e.g., applications for customer relationship management, human resource management, outsourcing relationship management, field service management, enterprise resource planning (ERP), enterprise content management (ECM), business process management (BPM), product lifecycle management, etc.) may be used to increase productivity, to measure productivity and to perform the business functions accurately.

An aspect of the business applications is the large amounts of data or documents that can be used or generated for each business function in a business process. The documents may contain a large number of document types (e.g., orders, shipping documents, invoices, goods movements, etc.). The data or documents may be stored in a database (e.g., a relational database) and queried, analyzed or further processed by the business applications. The stored documents may be linked together and integrated to provide data integration and end-to-end business data visibility at all points of the business process. Relational data (e.g., document flow or history) describing the relations between various documents may be stored in the relational database.

For example, in the case of sales-related business transactions, individual transactions (e.g., inquiry, quotation, sales order, shipment, invoice, and returns, etc.) may be stored as individual sales documents (SD) in a "documents" or "documents flow" database. The relational data (so-called document flow or history) linking various individual documents may be stored in a database table (e.g., table VBFA) linking various individual documents. An entire chain of sales documents (e.g., inquiry, quotation, sales order, shipment, invoice, and returns, etc.) may create a document flow or history. In such case, the stored relational data may include direct relations between individual documents (e.g., "order leading to shipment," "shipment leading to invoice," etc.). Additionally, the stored relational data may include indirect or transitive relations (e.g., "order indirectly leading to invoice," etc.). The indirect or transitive relations ("redundant data") can be a large portion (e.g., 50%) of the stored data. In scenarios which involve a large number of documents, the memory requirements for storing the redundant data can be onerous.

Consideration is now being given to data models, and systems and methods for utilizing "document flow" databases, which exclude redundant relational data

SUMMARY

Data on documents is stored in a documents database (e.g., a relational database) according to a hierarchical model to facilitate determination of documents flows, which may be consumed, for example, by business applications.

A computer-implemented method for determining a document flow of the documents is described herein. The method includes assigning a hierarchical tree-like structure to the documents stored in the documents database. The hierarchical tree-like structure includes one or more hierarchy levels beginning with a document assigned to a root node of the tree-like structure, each hierarchy level being defined by direct relations between the documents assigned to pair(s) of tree nodes in the hierarchy level. The method further includes assembling a tabular representation of the document flow, for a pre-determined number of hierarchy levels, of the hierarchical tree-like structure assigned to the documents. Only direct document-document relations may be used or necessary for assembling the tabular representation of the document flow. The tabular representation may be a virtual table or consumable provided to a consuming business application.

The details of one or more implementations are set forth in the accompanying drawings and the description below. Further features of the disclosed subject matter, its nature and various advantages will be more apparent from the accompanying drawings, the following detailed description, and the claims.

DETAILED DESCRIPTION

A hierarchical data model is used to assign a hierarchical tree-like structure to relational "business transactions data" or "documents" data that may be consumed by a business application or may be stored in a database, in accordance with the principles of the present disclosure.

Beginning with a root node object, each branch (or sub branch) of the tree-like structure may represent a direct object-object relation in the data. The hierarchical tree-like structure may include several levels of hierarchy with each level defined by the direct relations between the pairs of tree nodes/objects in the level.

For convenience in description herein, the terms "database", "table" and "database table" may be used interchangeably herein. Further, the terms "business transactions data" and "documents" may be used interchangeably herein.

Figure 1:
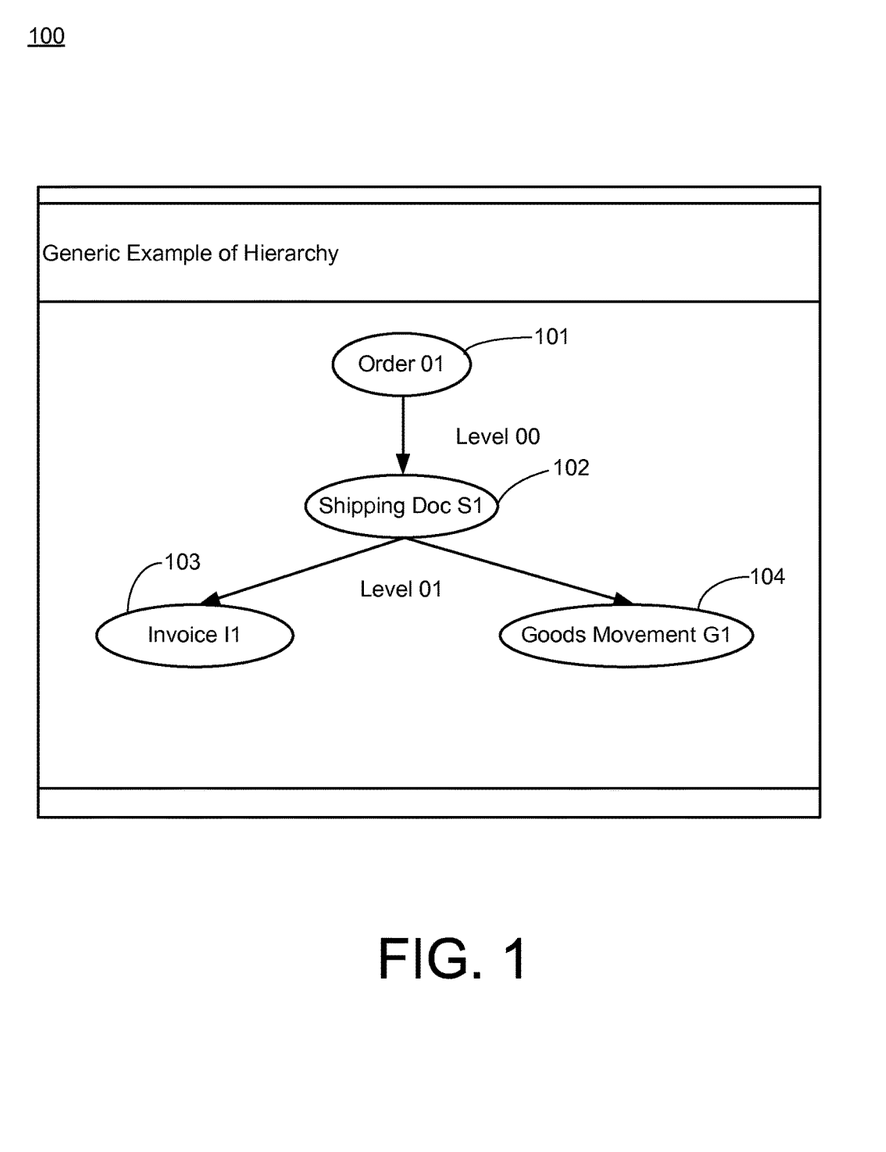
FIG. 1 is an illustration of an example hierarchical tree-like structure that may be assigned by a hierarchical data model to sales transactions data, in accordance with the principles of the present disclosure.

FIG. 1 shows, for example, a hierarchical tree-like structure that may be assigned by the hierarchical data model to the data in a use case involving sales transactions data. The sales transactions data may include objects or documents such as orders, shipping documents, invoices, goods movements, etc. These documents may relate to each other as predecessor and successor. For example, an order document (predecessor) may lead to a shipment document (successor). The shipment document (predecessor) may lead to an invoice document (successor) and/or a goods movement documents (successor). FIG. 1 schematically shows a 2-hierarchy level tree-like structure model representation 100 of the document flow in the foregoing example. In tree-like structure model representation 100, document 101 (e.g., order O1) is the root node of the tree-like structure and document 102 (e.g., shipping document S1) is a successor object to the root node object. The predecessor-successor relationship between root node (document 101) of the tree-like structure and document 102 may define a first level of the hierarchy starting from the root node. Document 102 (e.g., shipping document S1) has predecessor-successor relationships with document 103 (e.g., invoice document I1) and document 104 (e.g., goods movement document G1). These predecessor-successor relationships may define a second level of the hierarchy starting from the root node. (For convenience, the first level and the second level of the hierarchy are visually labeled in FIG. 1 as "Level 00" and "Level 01," respectively).

With reference to the 2-hierarchy level tree-like structure model representation shown in FIG. 1, it will be noted that if document 102 (e.g., shipping document S1) were to be considered to be a root node of a sub-tree, the predecessor-successor relationships between shipping document S1 and documents 103 and 104 would define a first level of the hierarchy starting from the root node (S1) of the sub-tree.

Only direct object-object relationships for a predetermined number of hierarchy levels "n" may be stored in a business application database or table constructed or assembled under the foregoing hierarchical data model, in accordance with the principles of the present disclosure.

Figure 2:
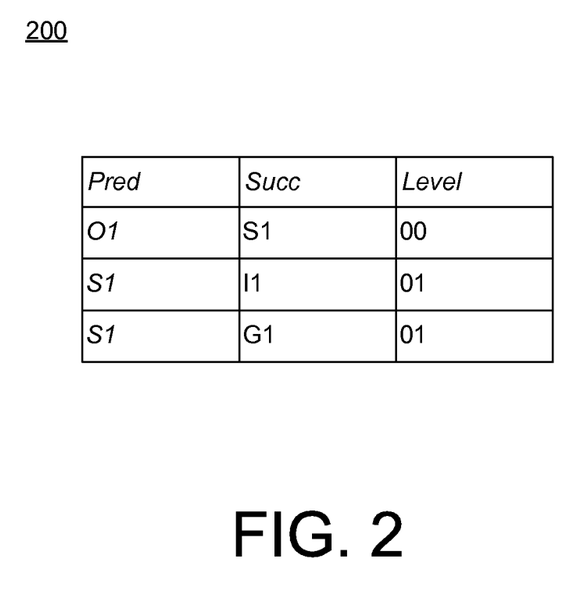
FIG. 2 is a tabular representation of a 2-hierarchy level tree-like structure model of a document flow, in accordance with the principles of the present disclosure.

FIG. 2 shows an example database table 200 representing the 2-hierarchy level tree-like structure 100 of a document flow. Table 200 may be assembled using, for example, Advanced Business Application Programming (ABAP) language and SQL commands. Table 200 may be made available to users as an ABAP consumable. As shown in FIG. 2, table 200 may include rows indicating that order document O1 and shipping document S1 are directly related as predecessor (pred) and successor (succ) objects in hierarchy level 00, shipping document S1 and invoice document I1 are directly related as predecessor and successor objects in hierarchy level 01, and further shipping document S1 and goods movement document G1 (I1) are also directly related as predecessor and successor objects in hierarchy level 01.

Figure 3:
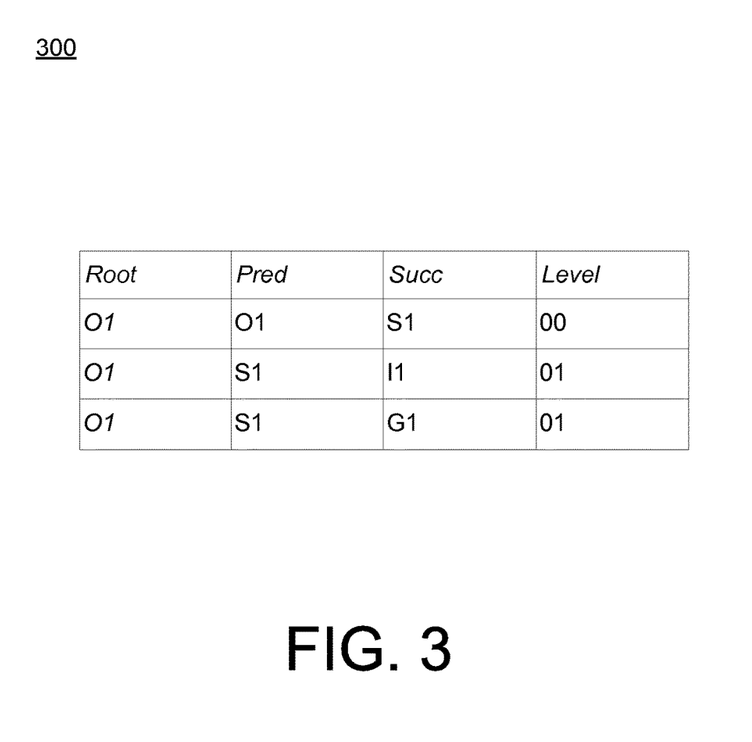
FIG. 3 is another tabular representation of the 2-hierarchy level tree-like structure model of the document flow of FIG. 2, in accordance with the principles of the present disclosure.

FIG. 3 shows another example database table 300 of the 2-hierarchy level tree-like structure 100 of FIG. 1. Table 300, like table 200 may be made available to users as an ABAP consumable. Table 300 may be an extension or enrichment of table 200 (FIG. 2) by further including the root node (e.g., O1) as a column or key in the table. Such extension or enrichment of the database table may be useful, for example, when multiple hierarchies for multiple roots are selected for inclusion or querying in the database tables. Including the root node (e.g., O1) as a column or key in the table may advantageously allow data for the multiple hierarchies to be read in one select/round-trip to the database.

Figure 4:
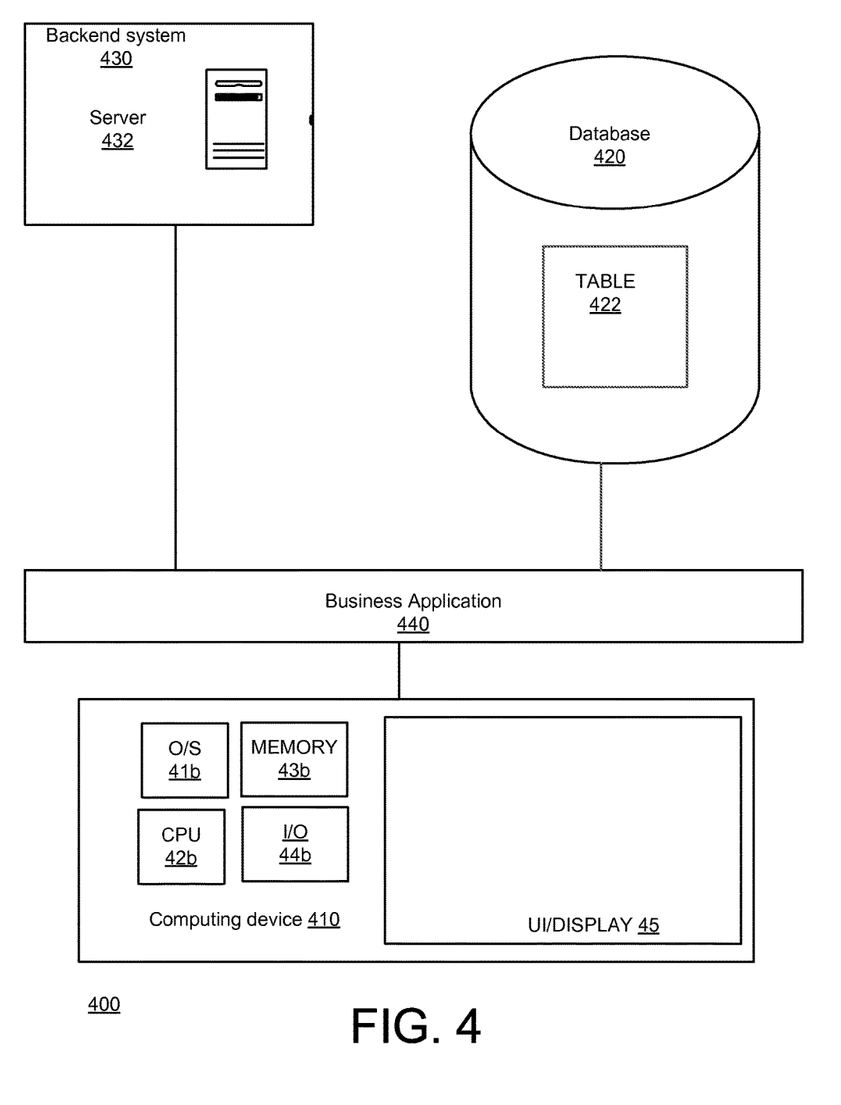
FIG. 4 is a schematic block diagram showing an example business application computer system including a relational database, in accordance with the principles of the present disclosure.

FIG. 4 is a schematic block diagram showing an example business application system including a relational database 420, in accordance with the principles of the present disclosure.

System 400 may include a business application 440 coupled to relational database 420. Business application 440 may generate business transactions data (e.g., documents) to be stored in relational database 420 and/or may consume the business transactions data stored in relational database 420.

Business application 440 may, for example, be hosted or launched on a computer 410. Computer 410, which includes an O/S 41b, a CPU 42b, a memory 43b, and I/O 44b, may further include a user interface (UI) or display 45. Although computer 410 is illustrated in the example of FIG. 4 as a single computer, it may be understood that computer 410 may represent two or more computers in communication with one another. Therefore, it will also be appreciated that any two or more components 420-440 of system 400 may similarly be executed using some or all of the two or more computers in communication with one another. Conversely, it also may be appreciated that various components illustrated as being external to computer 410 may actually be implemented therewith. In an example scenario, business application 440 may be an application, which can run on computer 410 or, for example, in another computing environment (e.g., Backend system 430/Server 432).

As noted previously, a hierarchical data model may assign a hierarchical tree-like structure to the business transactions data that may be stored in relational database 420 with each branch (or sub branch) of the tree representing a direct object-object relationship. The data may be stored in a table (e.g., Table 422) in a format, which, for example, is similar to that of table 200 (FIG. 2). Consumable representations (e.g., similar in format to table 200 or table 300) of the business transactions data stored in relational database 420 may be generated on the fly and made available to users, for example, as single query responses.

In an example implementation, the database or table (e.g., Table 422) may be constructed using ANSI-SQL compatible declarations (e.g., Open-SQL declarations), in accordance with the principles of the present disclosure.

Predecessor objects and successor objects in the database or table (e.g., Table 422) may, for example, be defined as follows.

Predecessor: (Document ID (attribute VBELV), Item number (attribute POSNV), Document type (attribute VBTYP_V)).

Successor: (Document ID (attribute VBELN), Item number (attribute POSNN), Document type (attribute VBTYP_N)).

A pre-determined number of hierarchy levels may be included in the tree-like structure representation of the data in the database or table (e.g., Table 422). The database or table may be configured using the ANSI-SQL compatible declarations so that a single database view (or query) can retrieve a complete hierarchical view of the data.

Determination of Document Flow

A business application or user may need to view or use data stored in a documents database or table. The documents database may be a relational database that includes only direct object-object relationships data for a pre-determined number of hierarchy levels "n" (as shown, for example, in Table 200), or may be a database (e.g., a legacy database) that includes additional data (e.g., data on indirect relationships as in a VBFA table). The documents database or table may be dynamic or volatile database, and may contain a large number of data records, which may be updated frequently.

A database view (or a stored query) may be established to view or extract selected data from the documents database (e.g., VBFA table, Table 422) consistent with the hierarchical data model described herein. The result set (a virtual table) may be computed or collated dynamically on the fly from current data in the database when access to that database view is requested, for example, by the business application. The result set may be returned as a consumable to the business application. Consistent with the hierarchal data model described herein, a single database view may configured to view or access a complete set of documents data spanning a pre-determined number M of hierarchical levels in the database (e.g., VBFA, Table 422). The single database view (query) may include SQL self-join commands to self join the database table N times to iteratively generate data records level-by-level for hierarchy levels up to N.

The database view (query), which may, for example, be written in Data Descriptive Language (DDL), may be coded to limit access to the selected data (or the predetermined number of M of hierarchical levels) in the database by using "where" clauses in the "select" statements in the database view (query) DDL declaration. The predetermined number of M of hierarchical levels for the database view (query) may be specified at design time.

An example portion of a DDL declaration for a database view (query) to view or retrieve document data for the M hierarchical levels (e.g., including levels L00 and L01) in the database table ("relation-table") may be as follows:

```
/* sub-result set for level = 00 */
    (Select    <level_00>.<pred>-key          as   root
               <level_00>.<pred>-key          as   pred
               <level_00>.<succ>-key          as   succ
               '00'              as    level
    From <relation-table> as level_00) as L00
Union all
/* sub-result set for level = 01 */
    (Select    <L01_L00>.<root>-key           as   root
               <level_01>.<pred>-key          as   pred
               <level_01>.<succ>-key          aas  succ
    From
    (Select    <level_00>.<pred>-key          as   root
               <level_00>.<pred>-key          as   pred
               <level_00>.<succ>-key          as   succ
    From <relation-table> as level_00) as L01_L00
    Join <relation-table> as level_01
    On<level_01>.pred = <L01_L00>.succ) as L01
Union all
    :
    :
/* sub-result set for level = M */
    :
Union all.
```

As shown for levels L00 and L01 in the example above, in the DDL declaration of the database view (query), a specific "union all" branch may be declared for each of the M hierarchy levels to collect or view only the data for the corresponding hierarchy level.

In order to achieve this for level 'm', a nested self-join condition may be used in the "union all" branch for level 'm', which first retrieves the rows representing level 'm−1' in the database table. These rows representing level 'm−1' may be then joined with the database table again, to determine the rows representing level 'm'. For each of the M levels, the nesting-depth in the foregoing DDL declaration is increased by one.

The final hierarchy may be obtained by merging the sub-result sets of all levels, 1 to M, using the last "union all" declaration. From a declarative perspective, selecting the sub-result set for each of the M levels (as in the foregoing DDL declaration) can be executed independently and therefore in parallel. However, from an execution perspective, doing so may result in redundant, identical operations (e.g., in the nested joins in the "union all" branches up to level 'm−1' when executing level 'm'). However, the computing platform used for executing the database view (query) (e.g., database and application platform HANA) may take these possible redundant, identical operations into consideration to reduce sequential operations when establishing an optimal query plan.

An example query plan (e.g., in HANA) may be based on the recognition that the complete set of "join" operations (in a current "union all" branch in the foregoing DDL declaration) need not be executed sequentially. For some of the joins, results may be available from the join operations of a previous "union all" branch. These results could be re-used and accordingly re-execution of the previous result-producing joins may be avoided in the current "union all" branch. Only the joins for which results are not available from previous "union all" branches need to be executed in the current "union all" branch. Accordingly, the example query plan may (e.g., to reduce CPU demand) minimize or reduce sequential execution within the nested joins in the database view by limiting execution in a current "union all" branch only to those joins for which results are not be available from the execution of the previous "union all" branch.

Instead of executing the sequential joins for each of the "union all" branches up to level M concurrently or in parallel, the example query plan may stagger or delay execution of the nested joins for the current "union all" branch based, for example, on the completion of execution of the joins in the previous "union all" branch. For example, when accessing rows in the database table for a hierarchy level 5, all rows need to be calculated within the nested joins up to level 4 (i.e. Level 0→Level 1→Level 2→Level 3→Level 4). The nested joins for levels 0-3 may have already been calculated as part of the "union all" branch for level 4. Therefore, when accessing level 5, the staggered operations for calculation of the nested joins up to level 4 may start as soon as the nested join calculations up to level 3 (in the course of accessing level 4) are completed. Staggering the nested join operations for the different levels may reduce CPU demand. It may be expected that with the staggered operations, CPU consumption will dependent linearly on the number of levels accessed in the execution of the database view (query).

Figure 5:
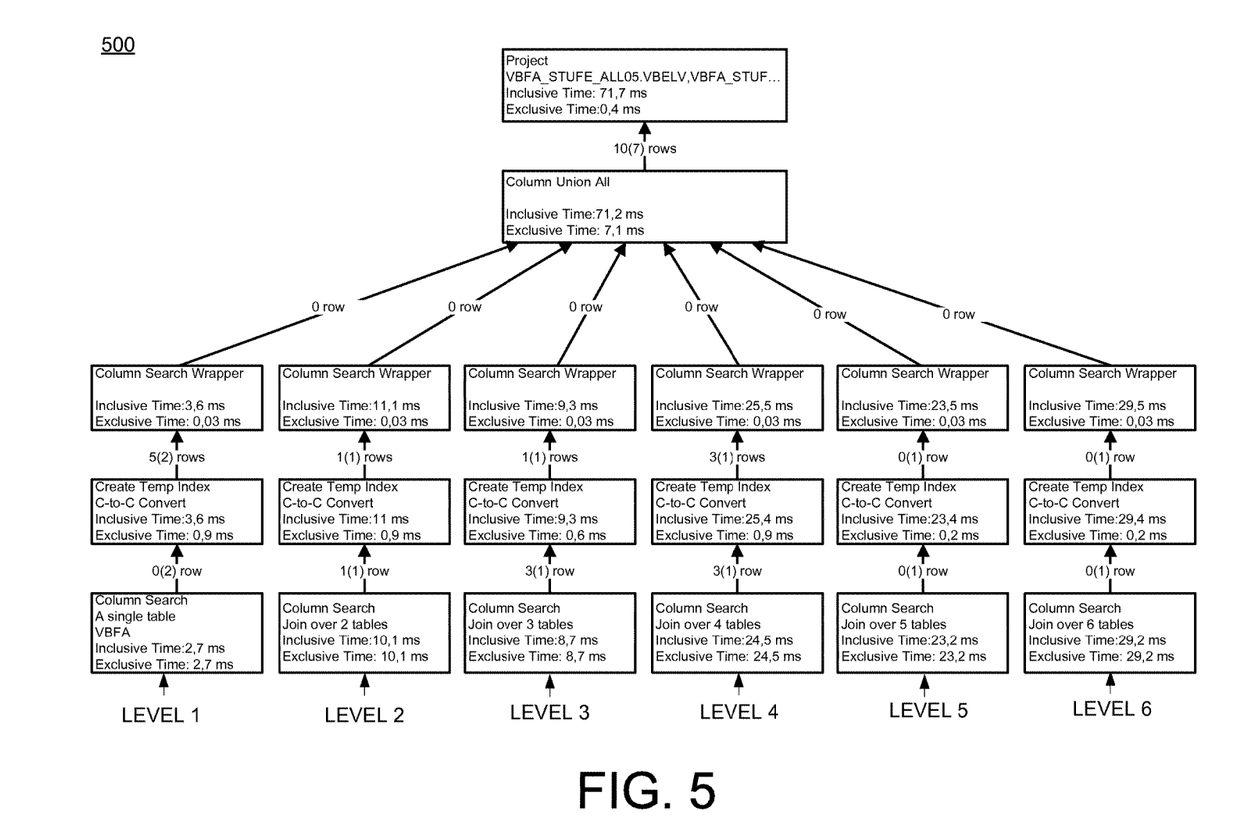
FIG. 5 is a schematic illustration of an example query plan, which may be established on a computing platform for executing a database view, in accordance with the principles of the present disclosure.
Figure 6:
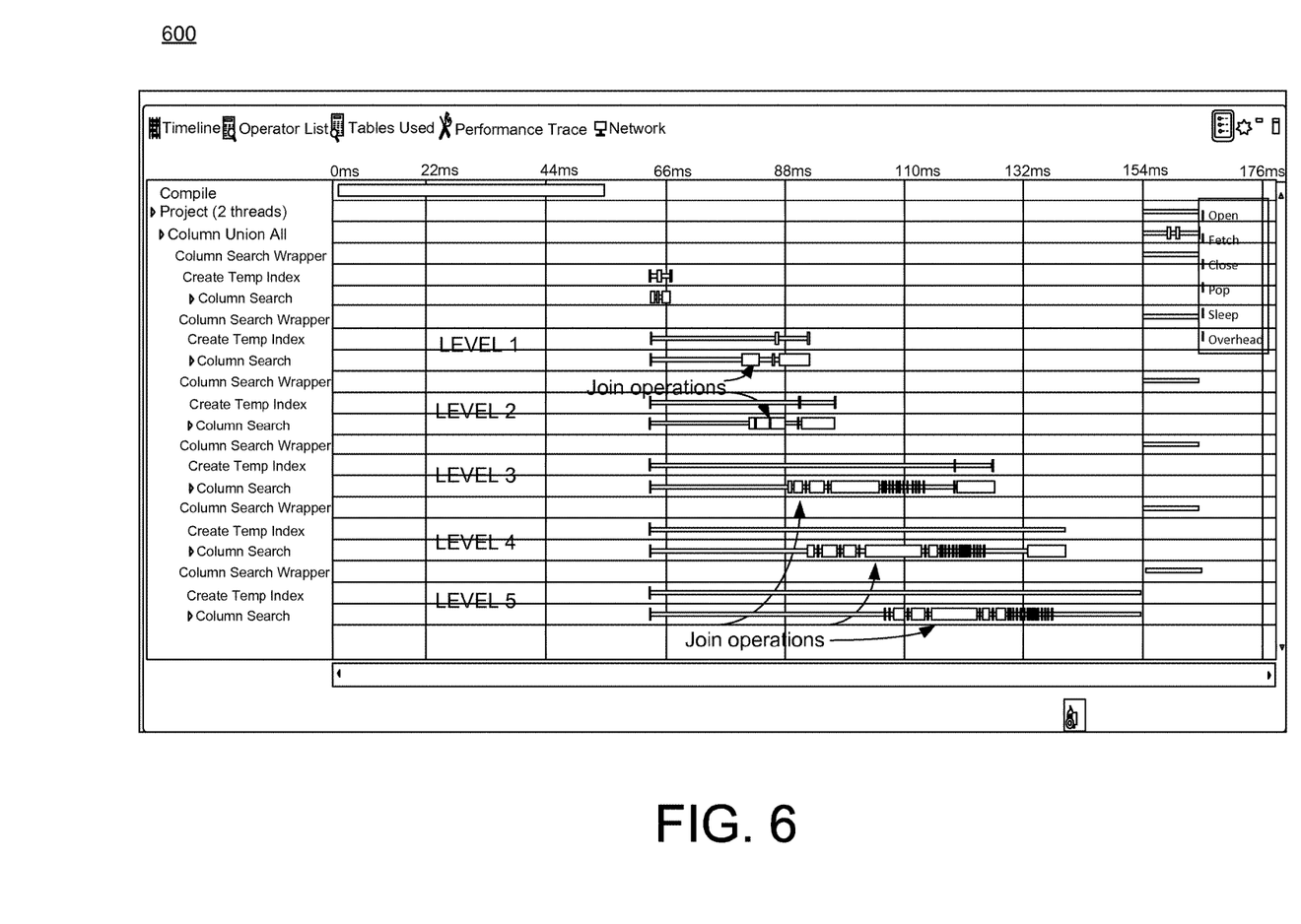
FIG. 6 is an illustration of an example timeline view of the execution of the example query plan of FIG. 5, in accordance with the principles of the present disclosure.

FIG. 5 shows an example query plan 500, which may be established in HANA, for a 6-hierarchy level database view (query). Each independent vertical column of boxes in the figure represents a level-specific "union all" branch in the database view (query). Further, FIG. 6 shows an example timeline view 600 of the execution of query plan 500. Timeline view 600 shows the staggered execution of the join operations in the parallel "union all" branches for levels 1-5 according to query plan 500. As shown in the figure, execution of join operations (at least for level 3 to 5) show considerable overlap in time. This overlap in execution times indicates that the execution time of the database view (query) may grow at most linearly with the number of levels queried.

Test Implementations of Hierarchical Data Model

Implementations of the hierarchical data model and a database view (query) (similar to that described above) were tested on a computer system, which included a HANA platform coupled to a sales documents (SD) database (table VBFA) having about 250 million rows of data.

Tests were conducted to determine execution time differences between a database level representation of the data, which involves storing only the direct object-object relations (as described herein), and a conventional database level representation of the data, which involves storing the complete tree structure including redundancies. A test involved determining the execution times for returning a complete hierarchy for one example order document to a business application (1) when accessing table VBFA directly (assuming that both direct and transitive relations, and the root-ID are persistently stored in table VBFA), and (2) when accessing table VBFA via the database view ("View") (assuming that only direct relations are persistently stored in table VBFA). The complete hierarchy for the one example order document included ten rows of data. Execution of the select statements to fetch the ten rows of data by accessing table VBFA directly took about 3.5 ms. Execution of the select statement to fetch the ten rows of data via View took about 38 ms. The longer time to fetch the hierarchy via View in the test was expected as it involved selecting only direct object-object relations and calculating or reconstructing the tree structure based on interpreting the direct object-object relations (in contrast to accessing table VBFA directly, which involved selecting an already persistently stored hierarchical tree-like structure directly from table VBFA without the need to interpret object-object relations).

Another test involved determining the execution times for returning multiple complete hierarchies (i.e. five hierarchies) for five example order documents to a business application (1) when accessing table VBFA directly and (2) when accessing table VBFA via View. Execution of the select statements to fetch the five hierarchies by accessing table VBFA directly took about 9 ms. Execution of the select statement to fetch the five hierarchies via View took about 68 ms.

These tests demonstrated fetching hierarchies from the database via View takes more time than fetching the hierarchies by direct access (e.g., 38 ms vs. 3.5 ms and 68 ms vs. 9 ms). However, it will be noted that the times for fetching hierarchies from the database via View were still in an acceptable range on the order of tens of milliseconds (which may be below a human perception threshold, for example, when the results are displayed on a computer screen to a human user).

Figure 7:
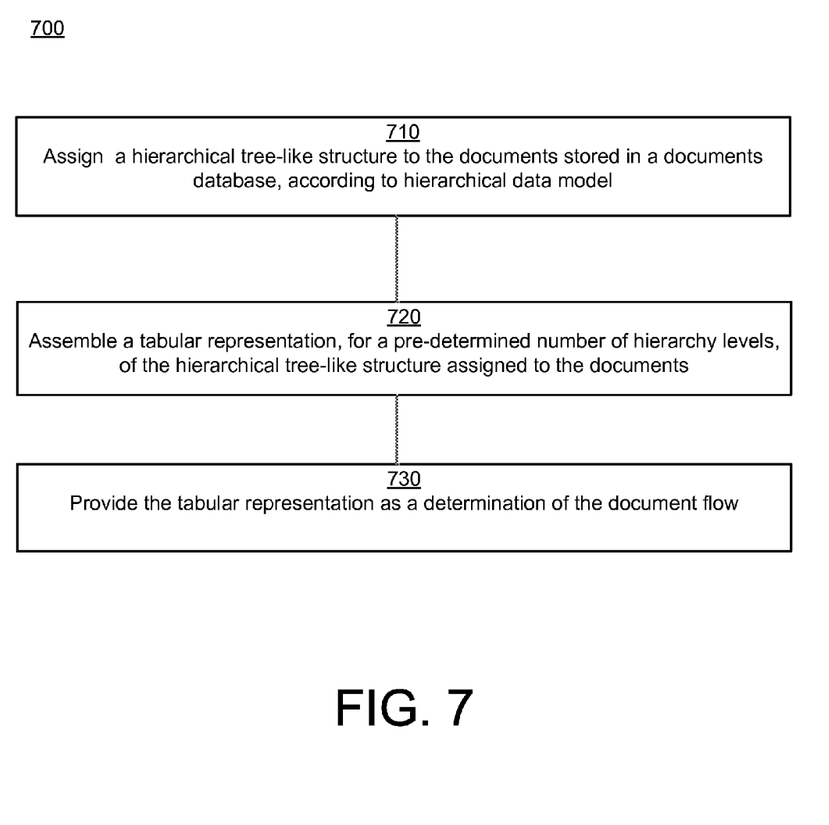
FIG. 7 illustrates an example computer-implemented method, in accordance with the principles of the present disclosure.

FIG. 7 shows an example computer-implemented method 700 for determining a document flow of documents (e.g., business transactions documents), in accordance with the principles of the present disclosure. Data on the documents (including relational data) may be stored in a documents database or table (e.g., Table 422, table VBFA, etc.).

Method 700 may include assigning a hierarchical tree-like structure to the documents stored in the documents database, according to a hierarchical data model (710). The hierarchical tree-like structure may include one or more hierarchy levels beginning with a document assigned to a root node of the tree-like structure. Each hierarchy level in the tree-like structure may be defined by direct relations between the documents assigned to pairs of tree nodes in the hierarchy level. According to the hierarchical data model, stored redundant information (e.g., indirect or transitive relations between the tree nodes/documents) is not required or necessary to describe the whole tree-like structure. Instead this information can be dynamically calculated or reconstructed based on the stored direct relations and made available on the fly as a consumable as and when needed. Thus, consistent with the hierarchical data model, the data on the documents (including relational data) stored in the documents database or table may include only direct relations data.

Method 700 may further include assembling a tabular representation, for a pre-determined number of hierarchy levels, of the hierarchical tree-like structure assigned to the documents (720), and providing the tabular representation as a determination of the document flow (730).

In method 700, assembling the tabular representation 720 may include using Advanced Business Application Programming (ABAP) language and SQL commands. Further, providing the tabular representation 730 may include making the tabular representation available as an ABAP consumable and may include storing the tabular representation in the documents database.

Also in method 700, assembling the tabular representation 720 may include establishing a database view (query) to view or extract selected data from the documents database, the database view being configured to compute the tabular representation when access to the database view is requested by a user. The database view may be written in Data Descriptive Language (DDL) and may be coded to limit access to selected data in the documents database by using "where" clauses in "select" statements. Further, the database view may be configured to view or access a complete set of documents data spanning a specified number M of hierarchical levels in the documents database. The database view may include nested self-join commands to self-join a database table 1 to M times to generate data records with hierarchy levels 1 to M, respectively.

Method 700 may further include, establishing a query plan on a computing platform to optimize execution of the database view including the self-join commands. The query plan may involve, for a hierarchy level (m), executing only the self-join commands for which results are not available from executions of the self-join commands for a previous hierarchy level, and staggering execution of the self-join commands for one or more of the hierarchy levels with respect to the execution of the self-join commands for another the hierarchy levels.

The various systems and techniques described herein may be implemented in digital electronic circuitry, or in computer hardware, firmware, or in combinations of them. The various techniques (e.g., method 700) may implemented via a computer program product, i.e., a computer program with instructions tangibly embodied in a machine readable storage device, for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, logic circuitry or special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for determining a document flow of documents, the method comprising:
    creating a hierarchical tree-like structure of documents to be stored in a documents database used for determining the document flow of the documents, the hierarchical tree-like structure being a document-to-document hierarchy with each document to be stored in the documents database being assigned to only a single respective tree node of the tree-like structure, the hierarchical tree-like structure including one or more hierarchy levels beginning with a document assigned to a root node of the tree-like structure, each hierarchy level being defined by direct relations between the documents assigned to pairs of tree nodes in the hierarchy level, each tree node having only a single document uniquely assigned to it;
    reducing the amount of data storage used for determining the document flow of documents by limiting storage in the documents database to only direct document-to-document relationships for a predetermined number of hierarchy levels while excluding storage of document-to-document relationships that are not direct;
    assembling a tabular representation, for the pre-determined number of hierarchy levels, of the hierarchical tree-like structure assigned to the documents; and
    providing the tabular representation as the document flow of the documents in the documents database to a querying computer application.

2. The method of claim 1, wherein assembling the tabular representation includes using Advanced Business Application Programming (ABAP) language and SQL commands.

3. The method of claim 1, wherein providing the tabular representation includes making the tabular representation available as an ABAP consumable.

4. The method of claim 1, wherein providing the tabular representation includes storing the tabular representation of only direct object-object relations in the documents database.

5. The method of claim 1, wherein assembling the tabular representation includes establishing a database view to view or extract selected data from the documents database, the database view being configured to compute the tabular representation when access to the database view is requested by a user.

6. The method of claim 5, wherein the database view is written in Data Descriptive Language (DDL) and is coded to limit access to selected data in the documents database by using "where" clauses in "select" statements.

7. The method of claim 5, wherein the database view is configured to view or access a complete set of documents data spanning a specified number M of hierarchical levels in the documents database.

8. The method of claim 5, wherein the database view includes nested self-join commands to self-join a database table 1 to M times to generate data records with hierarchy levels 1 to M, respectively.

9. The method of claim 8, further comprising establishing a query plan on a computing platform to optimize execution of the database view including the nested self-join commands.

10. The method of claim 9, wherein the query plan involves, for a hierarchy level (1-M), executing only the self-join commands for which results are not available from executions of the self-join commands for a previous hierarchy level.

11. The method of claim 9, wherein the query plan involves staggering execution of the self-join commands for one or more of the hierarchy levels with respect to the execution of the self-join commands for another the hierarchy levels.

12. A system for determining a document flow of documents, the system comprising a memory and a semiconductor-based processor, the memory and the processor forming one or more logic circuits configured to:
    create a hierarchical tree-like structure of documents to be stored in a documents database used for determining the document flow of the documents, the hierarchical tree-like structure being a document-to-document hierarchy with each document to be stored in the documents database being assigned to only a single respective tree node of the tree-like structure, the hierarchical tree-like structure including one or more hierarchy levels beginning with a document assigned to a root node of the tree-like structure, each hierarchy level being defined by a direct relations between the documents assigned to a pair of tree nodes in the hierarchy level, each tree node having only a single document uniquely assigned to it;
    reducing the amount of data storage used for determining the document flow of documents by limiting storage in the documents database to only direct document-to-document relationships for a predetermined number of hierarchy levels while excluding storage of document-to-document relationships that are not direct;
    assemble a tabular representation, for the pre-determined number of hierarchy levels, of the hierarchical tree-like structure assigned to the documents; and provide the tabular representation as the document flow of the documents in the documents database to a querying computer application.

13. The computer system of claim 12, wherein the logic circuits are configured to make the tabular representation available as ABAP consumable.

14. The computer system of claim 12, wherein the logic circuits are configured to store the tabular representation in the documents database.

15. The computer system of claim 12, wherein the logic circuits are configured to execute a database view to view or extract selected data from the documents database, the database view being configured to compute the tabular representation when access to the database view is requested by a user.

16. The computer system of claim 15, wherein the database view is coded to limit access to selected data in the documents database by using "where" clauses in "select" statements.

17. The computer system of claim 15, wherein the logic circuits are further configured to execute the database view to view or access a complete set of documents data spanning a specified number M of hierarchical levels in the documents database.

18. The computer system of claim 15, wherein the logic circuits are further configured to execute nested self-join commands in the database view to self-join a database table 1 to M times to generate data records with hierarchy levels 1 to M, respectively.

19. The computer system of claim 18, wherein the logic circuits are further configured to implement a query plan on a computing platform to optimize execution of the database view including the self-join commands therein.

20. A non-transitory computer readable storage medium having instructions stored thereon, including instructions which, when executed by a microprocessor, cause a computer system to:

create a hierarchical tree-like structure of documents to be stored in a documents database used for determining the document flow of the documents, the hierarchical tree-like structure being a document-to-document hierarchy with each document to be stored in the documents database being assigned to only a single respective tree node of the tree-like structure, the hierarchical tree-like structure including one or more hierarchy levels beginning with a document assigned to a root node of the tree-like structure, each hierarchy level being defined by direct relations between the documents assigned to a pairs of tree nodes in the hierarchy level, each tree node having only a single document uniquely assigned to it;

reduce the amount of data storage used for determining the document flow of documents by limiting storage in the documents database to only direct document-to-document relationships for a predetermined number of hierarchy levels in the documents database while excluding storage of document-to-document relationships that are not direct;

assemble a tabular representation, for the pre-determined number of hierarchy levels, of the hierarchical tree-like structure assigned to the documents stored in the documents database; and provide the tabular representation as a document flow of the documents in the documents database to a querying computer application.

\* \* \* \* \*